Jan. 8, 1963   K. R. PERRY   3,072,327
CONTROL AND INDICATING ARRANGEMENT
Filed Feb. 1, 1960
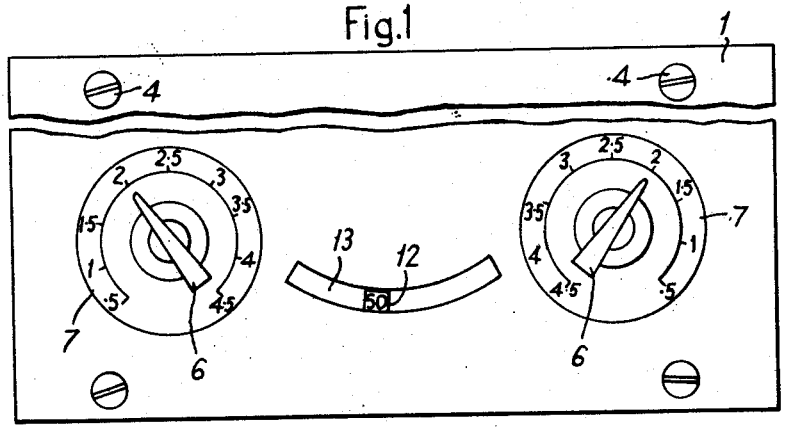
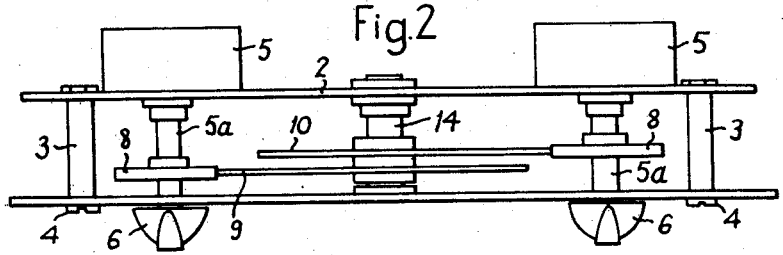
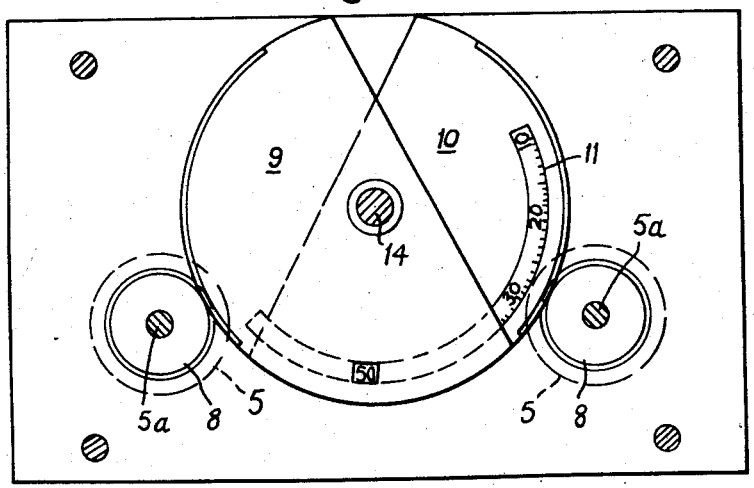
Inventor
K. R. Perry
By
Attorneys

United States Patent Office 3,072,327
Patented Jan. 8, 1963

3,072,327
CONTROL AND INDICATING ARRANGEMENT
Kenneth R. Perry, Cambridge, England, assignor to Pye Limited, Cambridge, England, a company of Great Britain
Filed Feb. 1, 1960, Ser. No. 5,762
Claims priority, application Great Britain Feb. 6, 1959
2 Claims. (Cl. 235—61)

The present invention consists in a control and indicating arrangement for controlling two variable quantities and indicating the value of both of said quantities separately and also for indicating the value of a resultant quantity which depends upon the value of both of said individual quantities and comprises two controls, one for varying the value of each of said quantities, two separate indicating means each respectively indicating the value of one of the two quantities set by the controls, and further indicating means operated by the movement of either of the controls and indicating the value of the resultant quantity.

Each control can be a manually operable control associated with indicating means in the form of a scale or a dial for indicating the value of the quantity set by that control. The further indicating means may consist of two parts which are movable relative to each other and one of which is calibrated in a range of values of the resultant quantity and the other of which serves as a mask for the values on the first part but is provided with an aperture through which a limited part of the range of values can be observed, each of the two parts being driven by the operation of one of the controls.

In a preferred form of the invention, the two controls each include a rotatable spindle rotation of which varies one of the two quantities and the spindles are each provided with a manual control knob associated with a scale and indexing means, or a pointer. The further indicating means may consist of two plate-like members arranged in variable overlapping relationship, one of which carries the range of values of the resultant quantity and the other of which is formed with an aperture through which a limited part of the range of said values can be observed. The two plate-like members are connected one to each of the spindles so that one plate moves with the rotation of one spindle and the other plate moves with rotation of the other spindle. The plates may be driven through gears or a friction drive.

In order that the invention may be more fully understood reference will now be made to the accompanying drawing, in which:

FIGURE 1 is a front elevation of one embodiment of control and indicating device according to this invention.

FIGURE 2 is a plan view of the device from above, and

FIGURE 3 is a front elevation with the front panel removed.

Referring to the drawings the control and indicating device consists of a front panel 1 and a rear plate 2 arranged behind and spaced from the front panel; the panel 1 and plate 2 being secured together by means of spacer members 3 and screws 4. The rear panel carries two electric variable resistors 5 which respectively serve for varying the values of two quantities, the spindles 5a of these resistors extending through the front panel 1 and being fitted with manually-operable control knobs 6 each in the form of a pointer associated with a scale 7 on the front panel. The scales 7 are each calibrated in the value of one of the variable quantities. Each spindle also carries a spur gear 8 accommodated in the space between the panel 1 and plate 2, the two spur gears being respectively arranged to mesh with teeth on the periphery of one of the two part-circular discs 9 and 10 mounted for rotation on a common spindle 14. Rotation of one of the spindles 5a will therefore cause the disc 9 to rotate, whilst rotation of the other spindle 5a will therefore cause the disc 10 to rotate. Thus the amount by which the discs 9 and 10 overlap will vary as either of the spindles is rotated. The disc 10 carries a series of calibrations on its front surface indicated generally at 11 and representing values of the resultant quantity which depend on the values of the variable quantities. The other disc 9 is formed with a window 12 through which the value of the calibration 11 on the disc 10 which is opposite the window can be read. An arcuate slot 13 is provided in the front panel 1 for viewing the value appearing in the window 12.

With this arrangement it will be apparent that the pointer knobs 6 and scales 7 on the front panel 1 indicate respectively the values at which the two variable quantities are set, and there can be observed simultaneously through the window 12 the value of the resultant quantity for any setting of the two variable quantities. It can be considered that the relative displacement of the discs 9 and 10 performs either addition or subtraction of the values set by the knobs 6 on the scales 7. However a resultant quantity which is obtained by a more complex relationship than simple addition or subtraction of the magnitudes set by the knobs 6 can also be indicated.

The control and indicating arrangement according to this invention may be employed, for example, in respiratory apparatus as described in our copending application No. 5,893, filed February 1, 1960. In this case the two potentiometers respectively control the inspiration and expiration periods and the scale associated with one control knob would be calibrated according to the inspiratory time whilst the scale associated with the other control knob would be calibrated according to the expiratory time and the resultant quantity would indicate the number of respiratory cycles per minute.

Whilst a particular embodiment has been described it will be understood that various modifications may be made without departing from the scope of this invention. For example other devices besides electric variable resistors may be used for controlling the value of the two quantities and these devices may be operated, if desired, remotely by electrical or mechanical means, instead of manually. Moreover the means for indicating the value of the resultant quantity may consist of two overlapping sliding scales instead of two relatively rotatable scales. In addition, although the scales have been shown as linear, the invention may be applied to quantities which vary in a non-linear manner.

I claim:

1. A manual control and indicating arrangement for manually controlling two variable quantities and indicating the magnitude of both said quantities separately and also for indicating the magnitude of a resultant quantity which depends upon the magnitude of both of said individual quantities, said arrangement comprising two separate rotatable manually operable controls, one for varying the magnitude of each of said quantities, two separate indicating means, each including a scale and pointer, for respectively indicating the magnitude of one of the two quantities set by the manually operable controls, and further indicating means operated by the movement of either of the manually operable controls and indicating the value of the resultant quantity, said further indicating means consisting of two part-circular discs which are mounted on a common axis of rotation and are movable relative to each other in a variable overlapping relationship, and one of which is calibrated in a range of magnitudes of the resultant quantity and the other of which serves as a mask for the first disc but is provided with an aperture through which a limited part of the range of magnitudes of the resultant quantity can be observed, and gear means connecting with the periphery of each of the part-circular discs for movement of said discs respectively with one of the two rotatable manually operable controls.

2. In a medical respirator, a manual control and indicating arrangement for manually controlling the inspiratory time and the expiratory time of the respirator and indicating the magnitude of both of said times separately and also for indicating the magnitude of the respiratory rate, which depends upon the magnitude of both of said inspiratory and expiratory times, said arrangement comprising two separate rotatable manually operable controls, one for varying the magnitude of each of said inspiratory and expiratory times, two separate indicating means, each including a scale and pointer for respectively indicating the inspiratory time and the expiratory time set by the manually operable controls, and further indicating means operated by the movement of either of the manually operable controls and indicating the respiratory rate, said further indicating means consisting of two part-circular discs which are mounted on a common axis of rotation and are movable relative to each other in variable overlapping relationship, and one of which is calibrated in a range of magnitudes of the respiratory rate and the other of which serves as a mask for the first disc but is provided with an aperture through which a limited part of the range of magnitudes of the respiratory rate can be observed, and gear means connecting with the periphery of each of the part-circular discs for movement of said discs respectively with one of the two rotatable manually operable controls.

References Cited in the file of this patent

UNITED STATES PATENTS

| | | |
|---|---|---|
| 1,401,315 | Clark | Dec. 27, 1921 |
| 1,971,238 | Silling | Aug. 21, 1934 |
| 2,293,175 | Ruhl et al. | Aug. 18, 1942 |

FOREIGN PATENTS

| | | |
|---|---|---|
| 247,314 | Great Britain | Feb. 18, 1926 |